(12) United States Patent
Zuckerman

(10) Patent No.: US 6,169,912 B1
(45) Date of Patent: Jan. 2, 2001

(54) RF FRONT-END WITH SIGNAL CANCELLATION USING RECEIVER SIGNAL TO ELIMINATE DUPLEXER FOR A CORDLESS PHONE

(75) Inventor: Lawrence H. Zuckerman, Pleasanton, CA (US)

(73) Assignees: Pericom Semiconductor Corp.; Pericom Technology Inc., both of San Jose, CA (US)

( * ) Notice: Under 35 U.S.C. 154(b), the term of this patent shall be extended for 0 days.

(21) Appl. No.: 09/283,129

(22) Filed: Mar. 31, 1999

(51) Int. Cl.[7] .................................................. H04M 1/00

(52) U.S. Cl. ............................. 455/570; 455/63; 455/78; 455/82

(58) Field of Search ................................... 455/296, 304, 455/305, 306, 307, 308, 24, 78, 82, 570; 370/278, 282

(56) References Cited

U.S. PATENT DOCUMENTS

| | | | |
|---|---|---|---|
| 4,064,378 | 12/1977 | Kitayama et al. | 179/170.2 |
| 4,685,099 | 8/1987 | White et al. | 370/30 |
| 4,897,863 | 1/1990 | Newland | 379/58 |
| 5,115,463 | 5/1992 | Moldavsky et al. | 379/58 |
| 5,121,391 | 6/1992 | Paneth et al. | 370/95.1 |
| 5,138,651 | 8/1992 | Sudo | 379/61 |
| 5,305,308 | 4/1994 | English et al. | 370/32.1 |
| 5,305,309 | 4/1994 | Chujo et al. | 370/32.1 |
| 5,327,458 | 7/1994 | Yamamoto | 375/12 |
| 5,375,122 | 12/1994 | Soupirot et al. | 370/95.1 |
| 5,410,735 | 4/1995 | Borchardt et al. | 455/42 |
| 5,604,799 | 2/1997 | Komoda et al. | 379/410 |
| 5,625,674 | 4/1997 | Paniccia, Jr. | 379/61 |
| 5,627,879 | 5/1997 | Russell et al. | 379/59 |
| 5,630,223 | 5/1997 | Bahu et al. | 455/296 |
| 5,691,978 | 11/1997 | Kenworthy | 370/278 |

OTHER PUBLICATIONS

Gavan & Joffee, "Improvement Methods Investigation to Optimize VHF Receivers Immunity to Desensitization" IEEE, 1990, pp. 612–617.

Ghose, "Collocation Of Receivers And High–Power Broadcast Transmitters" IEEE Trans. Broadcasting, vol. 34, No. 2, Jun. 88, pp. 154–158.

Minamisono and Satoh, "An Interference Cancellation Method for Small Earth Stations", Electronics and Communications in Japan, Part 1, vol. 76, No. 1, 1993, pp. 84–94.

Uwano and Watanabe, "Estimation Method for Extraction and Reinjection–Type Interference Canceller", IEICE Trans. Commun. vol. E79–B, No. 3, Mar. 1996, pp. 373–377.

(List continued on next page.)

Primary Examiner—Fan Tsang
Assistant Examiner—Blane J. Jackson
(74) Attorney, Agent, or Firm—Stuart T. Auvinen

(57) ABSTRACT

A fully duplex cordless telephone has a transmitter and a receiver connected to a common antenna. A broad-band antenna coupler such as a ferrite-core hybrid transformer may replace a more costly duplexer with filters. Since all characteristics of the transmit signal are known, the transmit signal removes itself from the receiver by signal cancellation. The canceling signal is extracted from the composite signal from within the receiver front end, after the antenna coupler and low noise amplifier. This composite signal is coupled to the first input of a difference amplifier, and the output of this amplifier is coupled to the remainder of the receiver. The composite signal is coupled to the second input, after its smaller receive component has been further suppressed, and its remaining transmit signal has been adjusted by two feedback control systems to restore its phase and amplitude to be equal to the transmit component of the composite signal. Obtaining the canceling signal from the receiver, instead of the transmitter, relieves the control systems of correcting for the rapid signal phase introduced by variable proximity of objects to the short antenna.

18 Claims, 9 Drawing Sheets

OTHER PUBLICATIONS

Kondo, and Date, "Simulation of an Echo Distortion Automatic Canceller in an FM Broadcasting Receiver", Electronics and Communications in Japan, Part 1, vol. 73, No.3, 1990 pp. 38–46.

So, "Adaptive algorithm for sinusoidal interference cancellation", Electronics Letters $23^{rd}$, Oct. 1997, vol. 33 No. 22, pp. 1910–1912.

Watanabe, Uwano, and Matsue, "Pre–Interference Canceller for Digital Microwave Radio Systems", Electronics and Communications in Japan, Part 1. vol. 78, No. 6, 1995, pp. 103–113.

RF FRONT-END WITH SIGNAL CANCELLATION USING RECEIVER SIGNAL TO ELIMINATE DUPLEXER FOR A CORDLESS PHONE

FIELD OF THE INVENTION

This invention relates to wireless communications, and more particularly to signal cancellation to eliminate the duplexer of a cordless phone.

BACKGROUND OF THE INVENTION

Wireless communications are frequently preferred by consumers and businesses because of the portability afforded. While cellular telephones allow use from almost anywhere, cordless phones permit use around the home and home-office via the same low cost telephone lines as wired phones. Cordless telephones, which continue to improve in quality, are one of the more successful consumer products of our times. Fierce competition ensures that prices remain as low as possible.

Cordless phones of the CTO type provide full-duplex communication by simultaneously using two channels of RF spectrum. FIG. 1 shows that channels are used in an up-link frequency band and in a down-link frequency band. While standards vary, in many countries ten or twenty-five two-way channels are reserved for use by cordless telephones at about 49 MHz.

The modulation is analog narrow band frequency modulation (NBFM), with a deviation of +/−5 KHz. The higher-frequency up-link band is used by the portable phone handset to transmit to the base station, while the lower-frequency down-link band is used by the base station to transmit to the portable handset. Channels are spaced about 15–40 KHz apart. Down-link channel 12 is one of 10–25 channels within the down-link bank. Down-link channel 12 transmits from the base station while up-link channel 10 transmits to the base station. Full-duplex communication is possible using separate channels 10, 12.

For 25-channel-pair phones, the down-link band is about 7.3% wide, but is separated from the up-link band by a stop band of only 3.8%.

The power of the transmitted signal is limited by each country. In the USA, the Effective Radiated Power is limited to −15 dBm. Antennas which are much shorter than ¼-wave must be employed for the user's convenience, especially for the handset station. The circuitry needed to feed such antennas is in practice very lossy; therefore, a signal about 15 dB higher (0 dBm) is typically applied by the transmitter to the antenna feed circuitry. Part of this lossy circuitry is a series loading coil, which cancels the large capacitive reactance presented by a short antenna.

These many design constraints, together with cost and size limits make construction of cordless phones a challenge. Precise circuits and multiple stages are used to meet the requirements.

Duplexer used to Attenuate Transmitted Signal to Receiver—FIG. 2

A single antenna is used for both the transmitted and received signals. Thus, it is necessary to provide antenna-coupler circuitry, which allows efficient coupling of the transmitted signal from the transmitter to the antenna and efficient coupling of the received signal from the antenna to the receiver. It is also critically important to sufficiently reduce the amount of transmitter signal power reaching the receiver, in order to prevent overloading of same. Circuitry which provides this isolation in the form of selectivity takes advantage of the different frequency bands used to transmit and receive. The tight spacing between the up-link and down-link bands makes this selectivity critical. Selectivity is improved by the use of a module of discrete components known as a duplexer. Duplexers now cost about 50 cents even with the high volumes produced.

FIG. 2 illustrates the coupling and selectivity functions provided by a typical duplexer. Antenna 20 is used both to transmit a signal from transmitter 18 and to receive a signal to be processed by receiver 16. Since portable phones must be compact in size, a full-sized antenna is not desirable. Coil 22 is placed in series with antenna 20 to provide an inductive reactance which is equal to the capacitive reactance presented by the undersized antenna, thus allowing usable amounts of antenna currents to flow.

Duplexer 14 passes the transmit signal from transmitter 18 to coil 22 and antenna 20 with only about a 4 dB (decibel) loss. The receive signal from the remote base station or handset is captured by antenna 20 and fed to duplexer 14. Owing to cost compromise, duplexer 14 attenuates the receive signal by about 5 dB before passing it to receiver 16. Selectivity is provided by duplexer 14 despite the close proximity of the up-link and down-link bands; as the transmit signal from transmitter 18 is attenuated by about 40 dB when measured at the input to receiver 16. This large attenuation of the transmit signal represents a considerable feat, since both signals are present on the single antenna 20. Additionally, the transmit signal is much stronger than the receive signal, even when the remote unit is only a few feet away.

FIG. 3 is a schematic diagram of a typical duplexer for a cordless phone. Tuned filters are used to select the receive signal and attenuate the transmit signal before the signal from the antenna is input to the receiver RX. The transmit signal is typically 40 dB stronger than the receive signal, even when the remote unit is only a few feet away.

The transmit signal is applied to a tap of inductor coil 122 of duplexer 14 which provides an approximate 100-ohms impedance match to the transmitter output. Coil 122 and capacitor 124 form a parallel tuned L/C circuit to ground, in order to be resonant over the transmit frequency band. External series coil 22 and antenna 20 are connected to duplexer 14 between coils 132, 136 and between capacitors 134, 138. Coil 132 and capacitor 134 form a parallel tuned series trap resonant at the receive band. This trap prevents the transmitter output circuit and the parallel tuned circuit consisting of coil 122 and capacitor 124 from loading down (i.e. presenting a low impedance to ground) the receive signal coming from antenna 20 and loading coil 22.

Two separate parallel tuned, series connected traps are provided by coil 136 and capacitor 138, and by coil 142 and capacitor 144. These traps are resonant at separate portions of the transmit frequency band and thus tend to block the transmitter signal from entering the receiver port RX. These traps also prevent loading down of the transmit signal by the receiver input circuitry and by the parallel tuned circuit consisting of capacitor 126 and coil 128. For 10-channel phones, the second trap of coil 142 and capacitor 144 can be deleted, but this second trap is helpful for the 25-channel base station phones because of the split down-link transmitter-band segments. The second trap is tuned to the additional segment used in North America while the first trap is tuned to the standard transmitter-band segments.

Coil 128 and capacitor 126 form a parallel tuned circuit to ground. It is resonant with the receive band, thus further blocking transmitter signals from entering the receiver. Coil 128 is tapped farther up than coil 122 to provide several thousand-ohm impedance matching to the receiver's RF amplifier transistor input. Each trap in the duplexer attenuates the desired signal by only a few dB, but the undesired signals by 20 to 30 dB.

The five coils 122, 132, 136, 142, and 128 are relatively large, bulky components. The coils and capacitors must be manufactured, tested, and inventoried, then individually assembled into a manufactured, shielding enclosure. The three traps must each be adjusted during production. It is desired to eliminate these discrete components and subassembly in order to reduce cost and space requirements.

FIG. 4 is a block diagram of a typical cordless phone using a duplexer antenna coupler. Controller 50 has many functions, including the generation of tones and signals for the phone line for a base station, or control of power and other features on the handset. Crystal 76 is used to generate a clock for controller 50, which can send commands to the remote unit by applying very low frequency signals to audio processing amplifier 52. For the remote handset, when the user speaks into the mouthpiece, the audio signal is picked up by a microphone (not shown) and applied as a simple analog voltage to audio processing amplifier 52. This audio signal is applied to voltage-controlled oscillator (VCO) 54. This varying voltage causes VCO 54 to vary or modulate the frequency generated; thus the person's voice is converted to a frequency-modulated signal by VCO 54.

VCO 54 is centered on a particular channel of either the down-link or up-link transmit frequency band of about 49 MHz, depending upon whether it is the base station or hand set station. It is centered on this channel by a voltage generated by a phase/frequency comparator, charge pump and loop filter which are at the output of the transmitter phase locked loop (PLL) frequency synthesizer 64. A Phase Locked Loop (PLL) is formed by feeding the output of VCO 54 back to transmit synthesizer 64, which phase-and-frequency compares the frequency-divided-down signal to a frequency-divided-down fixed-frequency clock derived from 10.24 MHz oscillator 62. The exact frequency is selected by the divide ratio of the divider acting on the VCO signal. The divider ratio number is selected by controller 50 (connection not shown). The divide ratio is set such that with the VCO on the desired center frequency, the two frequencies compared by the phase/frequency comparator will be equal. When the two phases are also equal, no pulses.are fed from the charge pump to the loop filter; so the loop filter output voltage feeding the VCO will remain constant.

The loop filter also controls the correction speed of the PLL. The loop filter of the transmitter PLL synthesizer 64 is set slow enough that even the lowest frequency components of the audio modulation entering VCO 54 will not be removed by loop correction.

For the typical VCOs used in this type equipment, the frequency of oscillation is determined by an inductance/capacitance (L/C) tuned circuit referred to as a Tank Circuit 74. In order to make the oscillator frequency voltage controllable, a portion of the capacitance is derived from a special capacitor whose value is determined by an applied voltage. Transmit power amp 56 increases the transmitted power, but also buffers the loading of antenna 20 from VCO 54. Otherwise, a person touching the antenna could cause frequency transients of the transmitted signal.

Low-pass filter 58 removes undesirable harmonics before the signal is applied to duplexer 14 and then to antenna 20 through a series coil (not shown). Duplexer 14 couples the transmit signal from the transmitter to the antenna, couples the receive signal from the antenna to the receiver, and prevents the transmit signal from reaching the receiver. It also improves the transmitter and receiver RF selectivity. The signal from duplexer 14 is amplified by radio-frequency RF amp 24 and filtered by band-pass filter 26, which is also adjusted to resonate over the receive band. Mixer 28 then multiplies the 33.8 MHz signal from Receiver VCO 46 by any signals within the incoming RF signal band, which produces the sum and difference frequency signals. Receiver VCO 46 is part of Receiver PLL synthesizer 48, which operates in similar fashion to Transmitter VCO 54. The only difference (other than being set to cause the VCO to oscillate at the desired receive frequency less 10.7 MHz instead of directly on the transmit frequency) is that the loop filter can be set up for more rapid correction in order to help the tank circuit 72 lower the noise floor. This is because there is no frequency modulation on the Receiver VCO.

A double-conversion superheterodyne receiver is used. Band-pass filter 30 selects signals close in frequency to 10.7 MHz (first intermediate frequency) from the output of mixer 28 in favor of the sum frequency band, and passes the signal to intermediate frequency amp 32. Second mixer 34 applies the 10.24 MHz reference signal (which is also used by both PLL synthesizers) 64, 48 as the Local Oscillator to step the signal down to 455 KHz, the second intermediate frequency Filter 36 is a 455 KHz band pass filter, which further rejects unwanted signals (including those in the sum-mix frequency band at 10.7 MHz+10.245 MHz. The high gain IF Amplifier 38 operates on the 455 KHz signal while demodulator 42 delivers a voltage which is proportional to the frequency of the IF signal, which is amplified by audio amplifier 44. The audio signal is then applied to the earpiece (if a hand held unit), or to the phone line through controller 50 (if a base station unit).

Highly integrated circuits (ICs) are available from Motorola, Toshiba, Samsung, National Semiconductor, and Mitsubishi for almost all of the analog processing and local oscillator systems of a cordless phone, but the front-end near the antenna typically uses discrete components, and modules such as the duplexer. For example, all blocks in the receiver from mixer 28 to controller 50 except the filters and tank circuits are integrated onto one or a few ICs. Transmitter blocks including audio processing amp 52 and transmit synthesizer 64 are also integrated on the IC. VCO 54, transmit power amp 56, and RF amp 24 are not integrated, presumably because of too low a value proposition. Filters 58, 26, 30. 36, and tank circuits 72, 74 are likewise not integrated.

While such high-integration IC chips and chip sets have reduced cost and complexity of the back end, the front or RF end of the cordless phone uses many discrete components. In particular, the duplexer is universally applied in cordless designs, adding to the cost and size of the phone. The difficult problem of the closeness of the up-link and down-link bands and the use of a single antenna for both transmit and receive signal makes the duplexer appear to be a necessary component. It appears far-fetched to remove the duplexer since the transmit and receive frequency bands are so close together.

Signal Cancellation Alternative

Signal cancellation has been used for high-interference areas such as near multiple transmitter antennas at a cellular site. Also, Kenworthy, in U.S. Pat. No. 5,691,978, discloses using signal cancellation to enable special full-duplex, single antenna RF systems. Rather than use separate bands as with cordless phones and virtually all other full duplex wireless communications, a single frequency band is used for both up-link and down-link. Thus, frequency selectivity cannot be used to keep the locally transmitted signal out of the receiver. Instead, a sample of the signal to be transmitted is extracted from the transceiver at a point in the circuit before it exists as combined with the incoming received signal. This pure reference of the transmit signal is adjusted in amplitude and phase so that when it is subtracted from the combined outgoing transmit and incoming receive signals, it will cancel out most of the transmitter signal before it reaches the receiver. Thus a single frequency band can be used for both transmission and reception.

The duplexer in a cordless phone has been eliminated by White et al. (U.S. Pat. No. 4,685,099), by selecting the intermediate frequency of the receiver to be exactly the difference between the up-link and down-link frequencies. Thus, the transmit signal is at the same frequency needed to heterodyne the incoming receive signal to the (first) intermediate frequency ("IF"). The network of L/C circuits which couples the transmit signal from the transmitter to the antenna and couples the receive signal from the antenna to the receiver input also provides a partial cancellation of the transmit signal which reaches the receiver; such that its power level is in the correct range to act as the mixer's local oscillator.

There are at least four disadvantages with this architecture. (1) As the band plan (difference in frequency between the up-link and down-link) determines the value of the receiver's first IF, such an IF value may not be optimized for the best performance or lowest cost of the receiver. If the IF value is too high, it may be difficult to achieve high IF gain at a low cost and power drain. If the IF value is too low, the image rejection may suffer unless the selectivity in the receiver front end (prior to the mixer) is sufficiently high, often expensive to realize. Even if the IF value is within the best range, if it does not match the frequency of standard IF filters, system cost may suffer. (2) For existing cordless telephone official band plans, the difference between the up-link and down-link frequencies is not the same for all channel pairs. Therefore, this system would require changing the first IF value for different communication channels. (3) Inasmuch as the local oscillator source is also the partially cancelled transmit signal, and it comes into the receiver front end along with the desired receive signal, the first active stage of the receiver apparently must be the first mixer, rather than an RF pre-amplifier. Such circumstance deprives the performance of the lower system noise figure usually afforded by RF pre-amplifier. (4) The most serious problem is that the local oscillator source for a mixer should be unmodulated; whereas in the full duplex system described in the White patent, the local oscillator source is the transmitter, which certainly must be modulated to be useful. Such modulation will be added to that of the receive signal, and the patent makes no mention of how to overcome this problem. In fact, this patent makes no mention of any of these problems.

What is desired is to remove the duplexer from the design of a cordless telephone by substituting a method which does not rely on high selectivity and which allows incorporation of almost all circuitry in a low cost integrated circuit. It is desired to replace the antenna coupling function of the duplexer with a lower-cost splitter/combiner that provides little or no selectivity. A higher-integration front-end of a cordless phone is desired to reduce cost and size. It is desired to use signal cancellation of the transmit signal, but without any restriction on the internal architecture of the receiver, such as its intermediate frequency.

SUMMARY OF THE INVENTION

An adaptive signal canceler for a radio-frequency (RF) receiver front-end has a composite-signal input for a composite signal from an antenna coupler. The composite signal includes a desired receive signal being collected by an antenna and an undesired remnant of a transmit signal generated in a local transmitter and being simultaneously transmitted by the same antenna. An output is coupled to a receiver for amplifying and other processing of the receive signal. A receiver signal generated from the composite signal is output with the transmit signal substantially cancelled, leaving the receive signal.

A limiting circuit is coupled to receive the composite signal. It limits the amplitude of the composite signal to generate a clipped signal having a constant amplitude. A synchronous detector is coupled to receive the clipped signal from the limiting circuit. It is coupled to receive the output receiver signal, and samples the output receiver signal in synchronization to the clipped signal and generating an adjust signal.

A canceling-signal generator is coupled to receive the clipped signal and controlled by the adjust signal. It generates a canceling signal from the clipped signal by adjusting a phase and amplitude of the clipped signal in response to the adjust signal.

A signal combiner is coupled to receive the composite signal and the canceling signal. It combines the canceling signal with the composite signal to generate the output receiver signal. Thus the canceling signal is generated from the composite signal that includes both the transmitter signal and the receiver signal from the antenna.

In further aspects the synchronous detector includes a minimizer for generating the adjust signal so as to minimize a time-averaged amplitude of the output receiver signal. The adaptive signal canceler operates to minimize the time-averaged amplitude of the output receiver signal.

In still further aspects the adaptive signal canceler is not connected to a transmitter generating the transmitter signal. The adaptive signal canceler generates the canceling signal from the composite signal and not from an isolated transmitter signal without the receiver signal.

In other aspects, relative motion of nearby objects causes impedance changes of the antenna. When the antenna is touched, such impedance changes are rapid and pronounced. The impedance changes alter the phase and amplitude of the transmitter signal in the composite signal. Therefore, the canceling signal is adapted to the impedance changes of the antenna by extracting the transmitter signal from the composite signal after the antenna. The canceling signal is adjusted in phase and amplitude to reflect the impedance changes that alter the transmitter signal.

DETAILED DESCRIPTION

The present invention relates to an improvement in cordless telephones. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that the multiple coupling function of the duplexer can be replaced by a simple splitter/combiner such as a transformer or wound ferrite core or other components with aggregate cost of under 10 cents. He also realized that the transmitter-to-receiver isolation function of the duplexer can be replaced by a signal cancellation circuit. This additional circuit can be more complex than the duplexer if it can be integrated onto an integrated circuit (IC).

Signal cancellation is useful to attenuate the unwanted transmit signal in the receiver front-end. The undesired transmit signal is precisely known since it is generated within the cordless phone and output to the common antenna. This transmit signal, suitably adjusted in amplitude and phase, can be input to a signal canceler where it is subtracted from the antenna signal input to the receiver. A more desirable approach (shown later in FIGS. 8, 9, and 10) is to extract the reference transmit signal from within the receiver, so that amplitude and phase variations caused by uncontrolled, time-dependent loading of the short antenna are accounted for.

Figure 5:
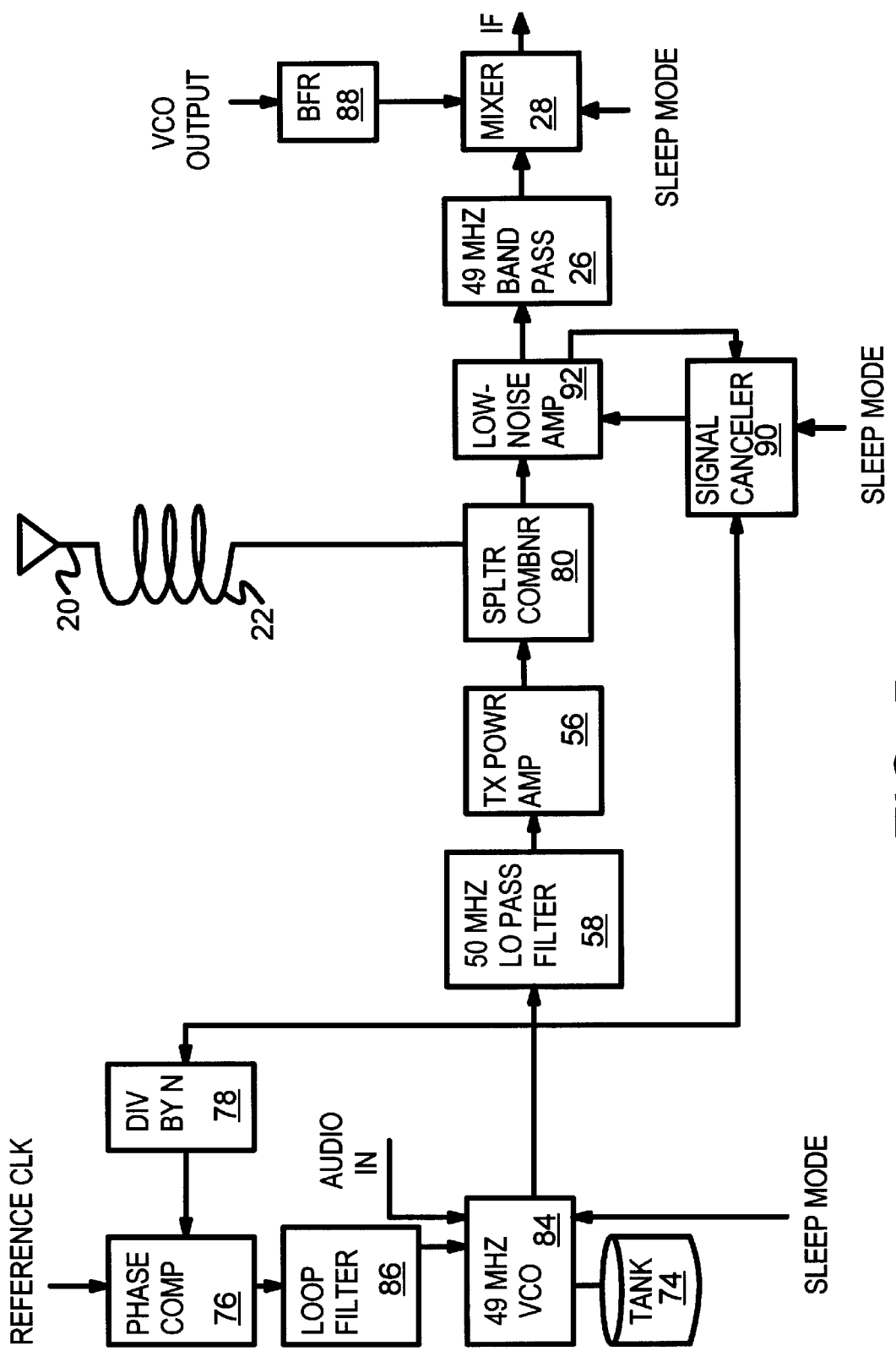
FIG. 5 shows a radio-frequency (RF) front-end of a cordless phone using signal cancellation and no duplexer.

FIG. 5 shows a radio-frequency (RF) front-end of a cordless phone using signal cancellation in place of a duplexer. Such front end circuits can be integrated together onto a front-end IC except perhaps for some of the filter components. The phase comparator 76, divide-by-N 78, mixer 28, and buffer 88 are contained in the high integration ICs mentioned above. The transmitter front-end receives a reference clock to phase comparator 76 and an audio input to voltage-controlled oscillator (VCO) 84. A conventional phase-locked loop (PLL) is formed by phase comparator 76, loop filter 86, VCO 84, and divider 78. VCO 84 is centered on a particular channel of either the down-link or up-link transmit frequency band of about 49 MHz, depending upon whether it is the base station or hand set. It is centered on this channel by a voltage generated by a phase/frequency comparator 76, charge pump (contained in 76), and loop filter 86. The completed PLL is formed by feeding the output of VCO 84 to frequency divider 78 and thence to the phase frequency comparator which compares this frequency-divided-down signal to the reference clock. The exact frequency is determined by the selected divide ratio of divider 78. The divide ratio is set such that with VCO 84 on the desired center frequency, the two frequencies compared by phase/frequency comparator 76 will be equal. When the two phases are also equal, no pulses are fed from the charge pump contained in 76 to loop filter 86; so the loop filter 86 output voltage feeding VCO 84 will remain constant.

The audio input modulates the control voltage to VCO 84 thus causing the output to be frequency-modulated. Loop filter 86 also controls the correction speed of the PLL. Loop filter 86 is set slow enough that even the lowest frequency components of the audio modulation entering VCO 84 will not be removed by correction.

For the typical VCOs used in this type equipment, the frequency of oscillation is determined by an inductance/capacitance (L/C) tuned circuit referred to as a Tank Circuit 74. In order to make the oscillator frequency voltage controllable, a portion of the capacitance is derived from a special capacitor whose value is determined by an applied voltage. In such a case the audio input can be applied to Tank Circuit 74.

Low-pass filter 58 filters out harmonics for the signal amplified by linear transmitter power amp 56. Transmit power amp 56 increases the transmit power, but also buffers the loading of antenna 20 from VCO 84. The amplified transmitter signal from amp 56 is coupled to antenna 20 though the splitter/combiner 80, and series loading coil 22. Series coil 22 provides the correct amount of inductive reactance to cancel out the capacitive reactance presented by the shortened antenna 20.

The antenna-coupler splitter/combiner 80 can consist of an untuned hybrid, mass-produced ferrite core with a small winding of about three tri-filar turns. It is a cylinder of roughly 3/16ths of an inch, with two parallel holes for the windings. These cores are commonly used by the TV and cable industries. The cost of the hybrid splitter/combiner assembly is about 7 cents. Hybrid splitter/combiner 81 provides no front-end selectivity as did the duplexer, but still provides a small amount of transmitter to receiver isolation, and signal losses are lower. Alternatively, Splitter/Combiner 80 can consist of a simple network of two series tuned circuits, which also provides a small amount of isolation. The impedance of the antenna connection can vary widely, especially when objects (such as a person's hand) are in close proximity to antenna 20. The impedance mismatch makes isolation difficult.

Figure 1:
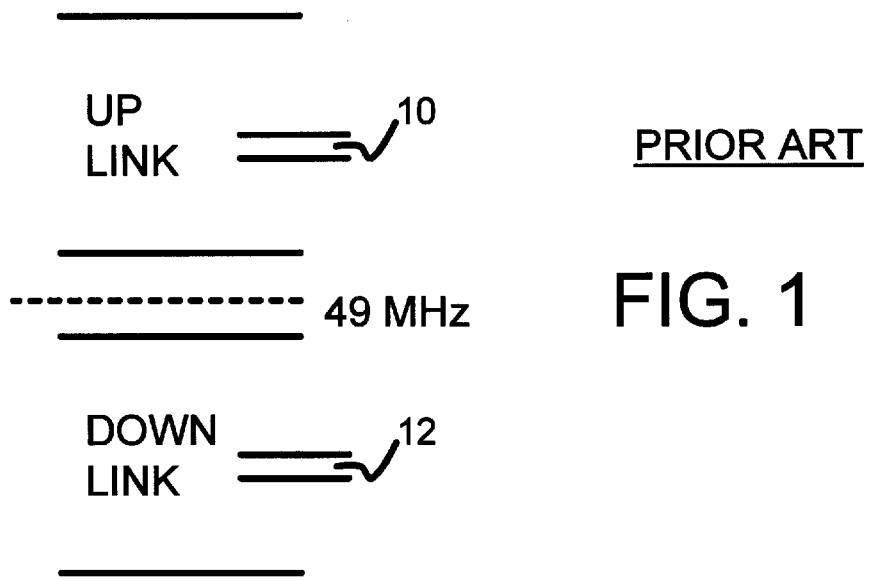
FIG. 1 shows that channels are used in an up-link band and in a down-link band.
Figure 2:
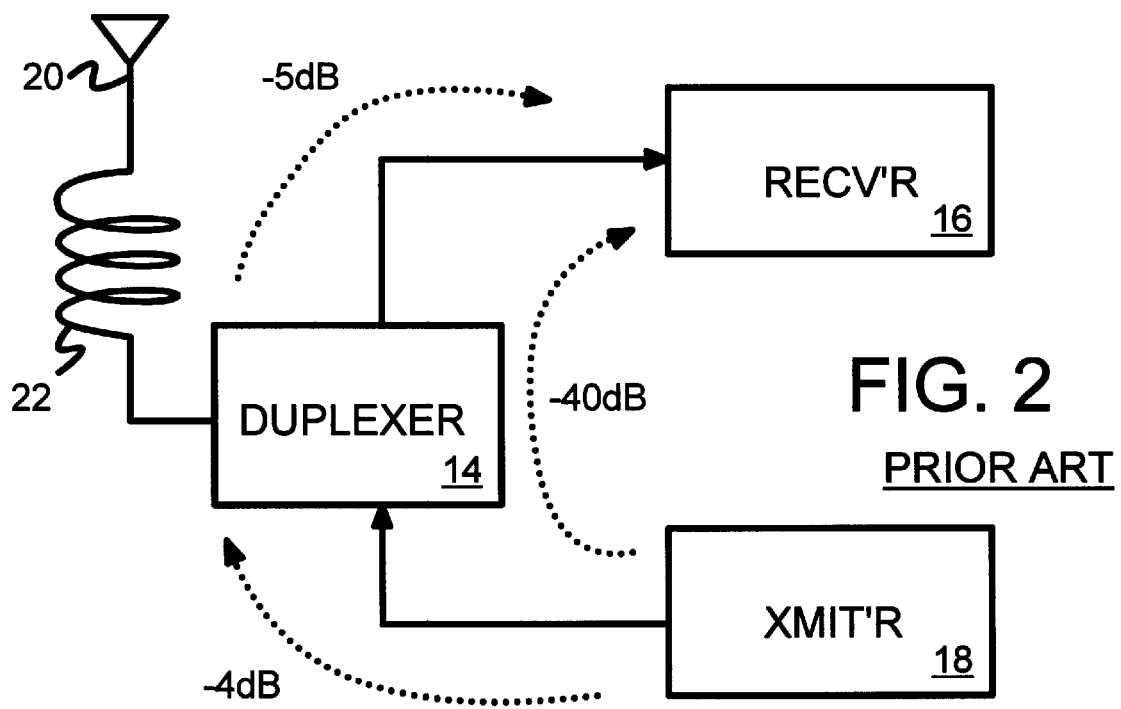
FIG. 2 illustrates the selectivity provided by a typical duplexer.
Figure 3:
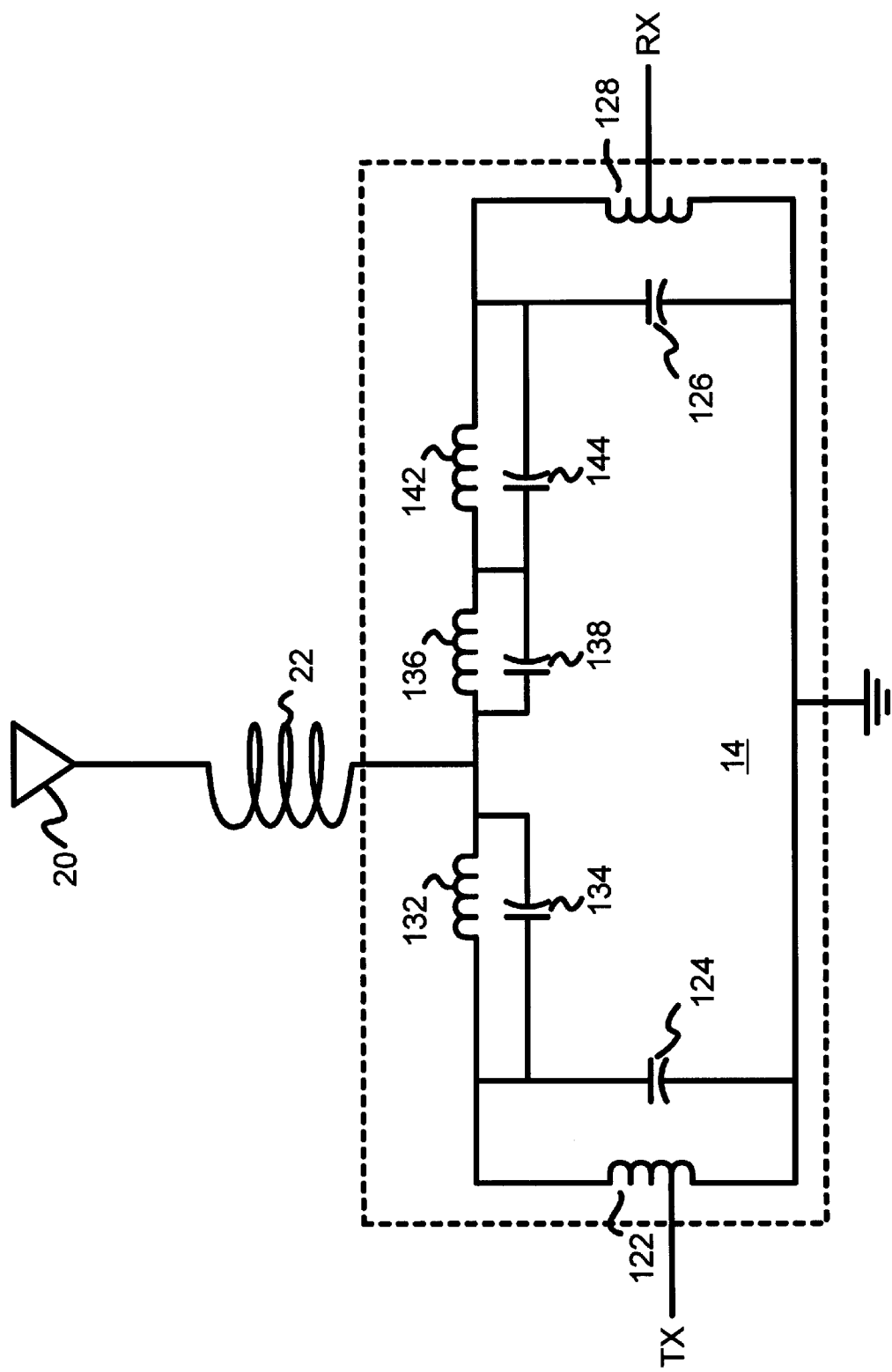
FIG. 3 is a schematic diagram of a duplexer for a cordless phone.

Antenna 20 is used for both the transmit and receive signals. As there is no duplexer of the general type described in FIG. 3, there will be enough residual transmit signal entering the receiver to seriously disrupt its operation. Low-noise pre-amp 92 is an RF pre-amplifier that strengthens both the receive and the transmit signals. Measured at the input of the low noise amp 92, the transmit signal is at least 40 dB stronger than the receive signal, the strength of which varies with distance and obstructions to the other station. The receive signal can be as much as about 100 dB lower than the transmit signal. 49 MHz Band Pass 26 is tuned to pass the receive signal with less attenuation than the transmit signal, which can be done; as the transmit signal occupies a slightly different frequency band.

Signal canceler 90 takes the transmitter signal from the VCO 84 and synchronizes and adjusts the phase and amplitude of the transmitter signal so that it is inverted relative to its phase entering low noise amp 92 and has equal amplitude. This processed transmitter signal from signal canceler 90 is added to the signal in low-noise pre-amp 92, so that the transmitter signal is subtracted from the combined receive and transmit signals passed through splitter combiner 80. The output from the low-noise amplifier is fed back to signal canceler 90 in order to allow it to control the phase and amplitude adjustments with reference to the results obtained.

Low noise amplifiers are almost always used at receiver inputs in order to maximize signal to noise ratio and therefore sensitivity. The output from low-noise pre-amp 92 is filtered by 49 MHz band-pass filter 26 to further filter out remaining transmitter signal and harmonics, as well as all other signals outside of its passband. Mixer 28 provides additional amplification and multiplies the filtered receive signal by the Local Oscillator signal from buffer 88. Normally, the VCO frequency is chosen to be the difference between the frequency of the desired receive signal and the intermediate frequency ("IF").

It should be understood that although cancellation of the transmit signal by the signal canceler system is substantial (reducing its voltage level by about 99%), under normal operating conditions, the transmit signal level at the input of mixer 28 is still very much greater than the receive signal level (up to about 60 dB stronger). The key consideration is that this remaining transmit signal be low enough in level that it does not overload mixer 28 or successive receiver stages and prevent same from processing the weakest useful receive signal. Finally, the various high selectivity elements following mixer 28 will eliminate the transmit signal.

Figure 4:
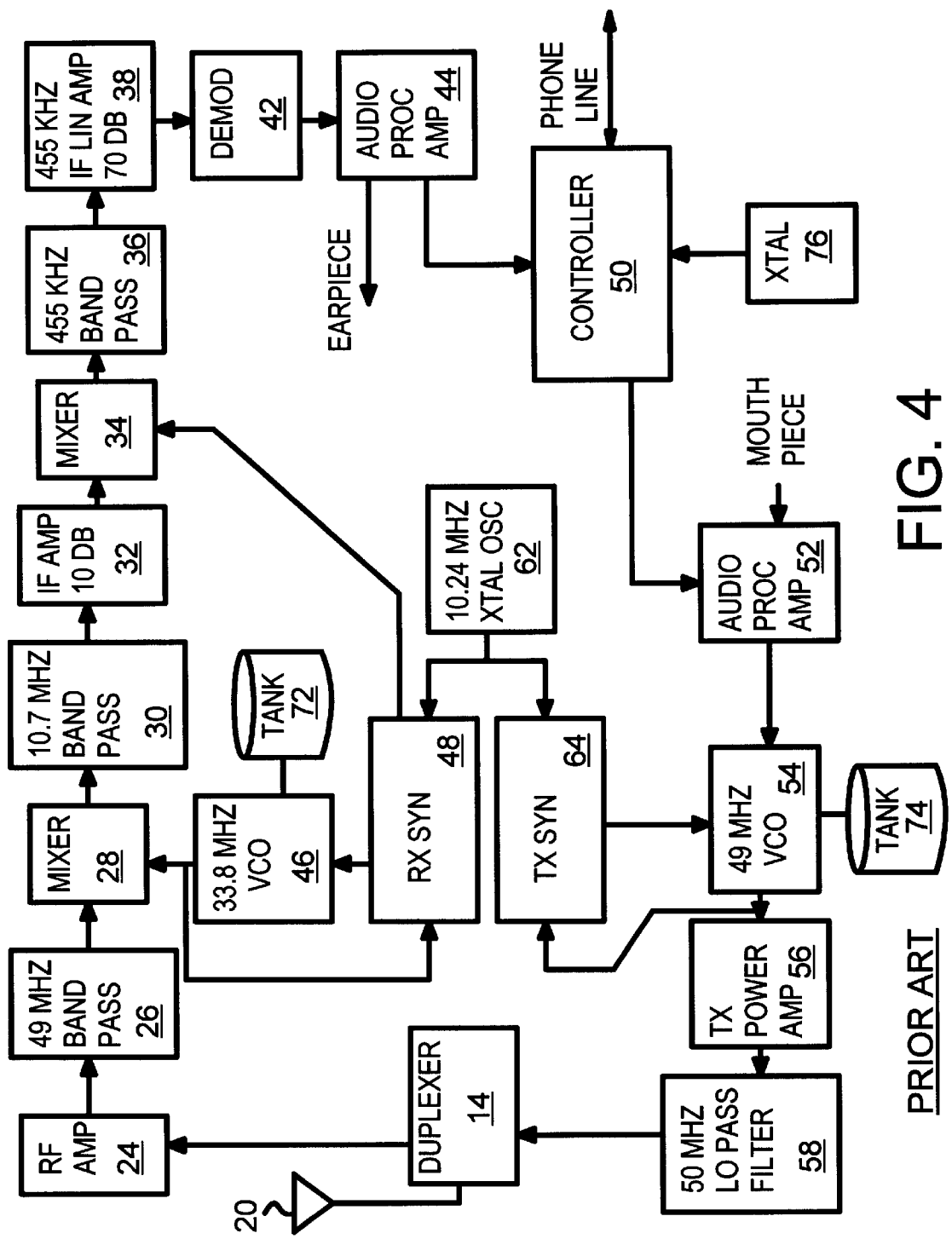
FIG. 4 is a block diagram of a cordless phone using a duplexer.

The output from mixer 28 is input to the rest of the superheterodyne receiver described for FIG. 4. Large-scale ICs are used to implement the back-end receiver and transmitter of the cordless phone. Such ICs are available from a variety of manufacturers as described earlier.

When the cordless phone system is not in use, but rather waiting for an incoming or outgoing call, certain circuits of the hand-held station can be powered down to extend battery life. A Sleep-mode signal is input to transmit VCO 84, signal canceler 90, and mixer 28 since these circuits draw significant active power. When the cordless phone is not in use, the hand-held station must still be able to receive signals from the base station to notify it of an incoming call. Therefore, the Sleep Mode signal does not disable mixer 28, but rather reduces its power drain. Such power drain reduction does not affect the mixer's ability to process the weak signal from the base station, but it does reduce the mixer's ability to operate without overloading from whatever local transmitter signal remains after the signal cancellation process. Inasmuch as the local transmitter (i.e. VCO 84) is shut off during these "sleep" periods, this problem does not exist.

Figure 6:
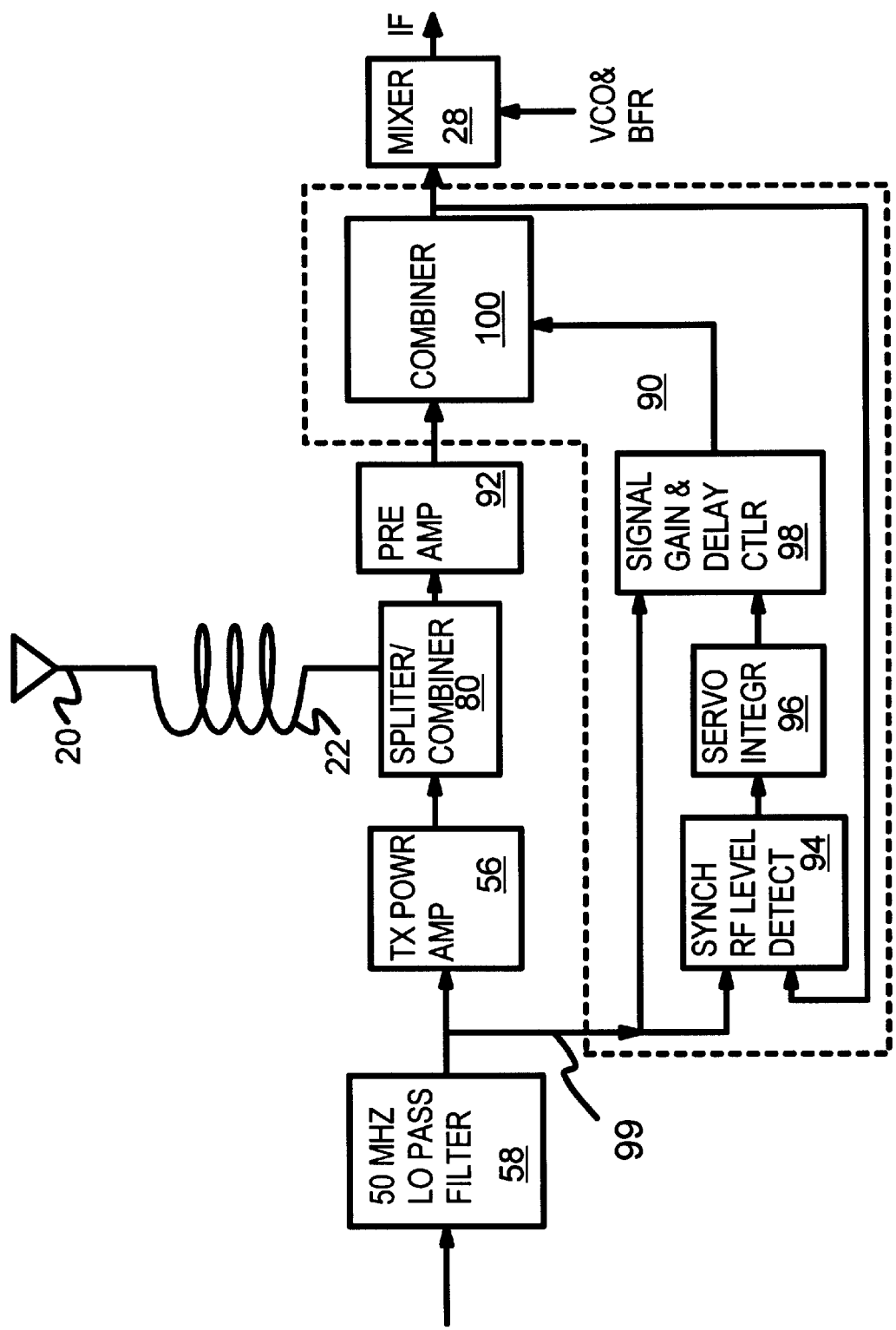
FIG. 6 highlights a signal canceler in a front-end of a cordless phone, with the transmit signal extracted from within the transmitter.

Signal Cancelar—FIG. 6

FIG. 6 highlights a signal canceler in the front-end of a cordless phone. The transmitter signal from low-pass filter 58 is sent to signal canceler 90 and to transmit power amp 56 before being coupled to antenna 20 through splitter/combiner 80 and series coil 22.

The signal from antenna 20 and the splitter/combiner antenna coupler contains both the desired receive signal and the much larger transmit signal. Both the receive signal and the remnants of the transmit signal are amplified by low-noise pre-amp 92, a pre-amplifier. Combiner 100 removes the transmit signal, outputting just the receive signal. Combiner 100 removes the transmit signal by adding an inverted transmit signal provided by signal canceler 90. Signal canceler 90 obtains the transmit signal from the transmitter itself at low-pass filter 58.

In order to fully and exactly cancel the transmit signal, the processed transmit signal from signal canceler 90 must be inverted in phase, but equal in amplitude to the transmit component of the combined transmit and receive signal fed from preamp 92 to combiner 100. (Alternatively, the phase of the signal from signal canceler 90 would not be inverted if combiner 100 were replaced by a difference amplifier.) These signal canceler functions are accomplished by signal gain & delay controller 98 controlled by servo integrator 96 in accordance with measurements made by the synchronous RF level detector 94.

Signal gain & delay controller 98 receives the transmit signal from the transmitter low pass filter 58 and, when driven by the correct voltage from servo integrator 96, provides a signal path having the correct gain and time delay so that the transmit signal fed to combiner 100 is exactly equal in level but 180 degrees out of phase with the transmit signal portion of the composite transmit/receive signal coming from pre-amp 92. During the periods when so adjusted, combiner 100 output contains no appreciable transmit signal—only the receive signal.

The synchronous RF level detector 94 multiplies the combiner 100 output signal by the transmit signal from low pass filter 58. The receive signal operates at a different frequency than does the transmit signal. Thus the receive signal is asynchronous to the transmit signal; the two signals are incoherent. Since there is no D.C. bias to the receive or transmit signals, the time-averaged voltage or amplitude of the desired receive signal is zero. Therefore, when combiner 100 output contains only the receive signal, synchronous RF level detector 94 has a zero output, which freezes the servo integrator 96 output voltage, thus maintaining the signal gain and delay controller 98 adjustment as is.

However, during periods when signal gain and delay controller 98 is not properly adjusted such that its output signal is equal in level but opposite in phase compared with the signal from pre-amp 92, an appreciable transmit difference signal appears at combiner 100 output. Positive or negative biases at synchronous RF detector 94 output result when the transmit signal is not exactly cancelled out. Since the receive signal is incoherent, over time the receive signal averages out to zero. The voltage biases detected are caused by the transmit signal not being exactly cancelled out. Servo integrator 96 integrates these D.C. voltages over time to eliminate instantaneous variations caused by the receive signal. These biases form an error signal used to adjust within signal gain and delay controller 98 the amplitude and phase of the inverted transmit signal input to combiner 100.

Difficult to Cancel Signals

Dynamic signal variations from the relative motion of objects close to the antenna are not easily cancelled when using the canceling signal from the transmitter. In order to fully and exactly cancel the transmit signal, the inverted transmit signal from signal gain and delay controller 98 should be inverted in phase, but equal in amplitude to the transmit component of the combined transmit and receive signal to combiner 100. It might seem ideal to use the transmit signal from the transmitter itself, such as from low-pass filter 58. FIG. 6 shows signal-cancellation source 99 is taken from the transmitter side of antenna 20.

However, the inventor has realized that the transmitter signal is altered in dynamic fashion by antenna 20 and series coil 22. The very short length of cordless phone antennas makes impedance matching critical. Further, cordless phones are handled in such a way that the user is close to or even touches the antenna, violently and rapidly altering its impedance. Thus the transmit signal entering the receiver will exhibit rapid changes of amplitude and phase relative to the signal present in the transmitter itself. Such rapid and violent changes would place considerable stress on the operation of the signal canceler measurement and control system, thus increasing the difficulty and risk of any product development engineering project.

The inventor has therefore realized that simply using the signal from within the transmitter as the source for signal cancellation may be impractical or even ineffective for cordless phones. While such an arrangement is effective in more robust settings, the unique nature of cordless phones makes signal cancellation of this design uncertain and problematic.

Use Signal from within Receiver for Canceling Signal Source

The inventor has further realized that these problems, which may or may not be unique to cordless phones and their short antennas, can be solved by using as the source for the canceling signal, not the signal from the transmitter, but rather the transmit signal from within the front end of the receiver itself. This may seem surprising or even absurd, since the signal in the receiver contains both the transmit and the receive signals, whereas the source of the canceling signal should be only the transmit signal.

Figure 7:
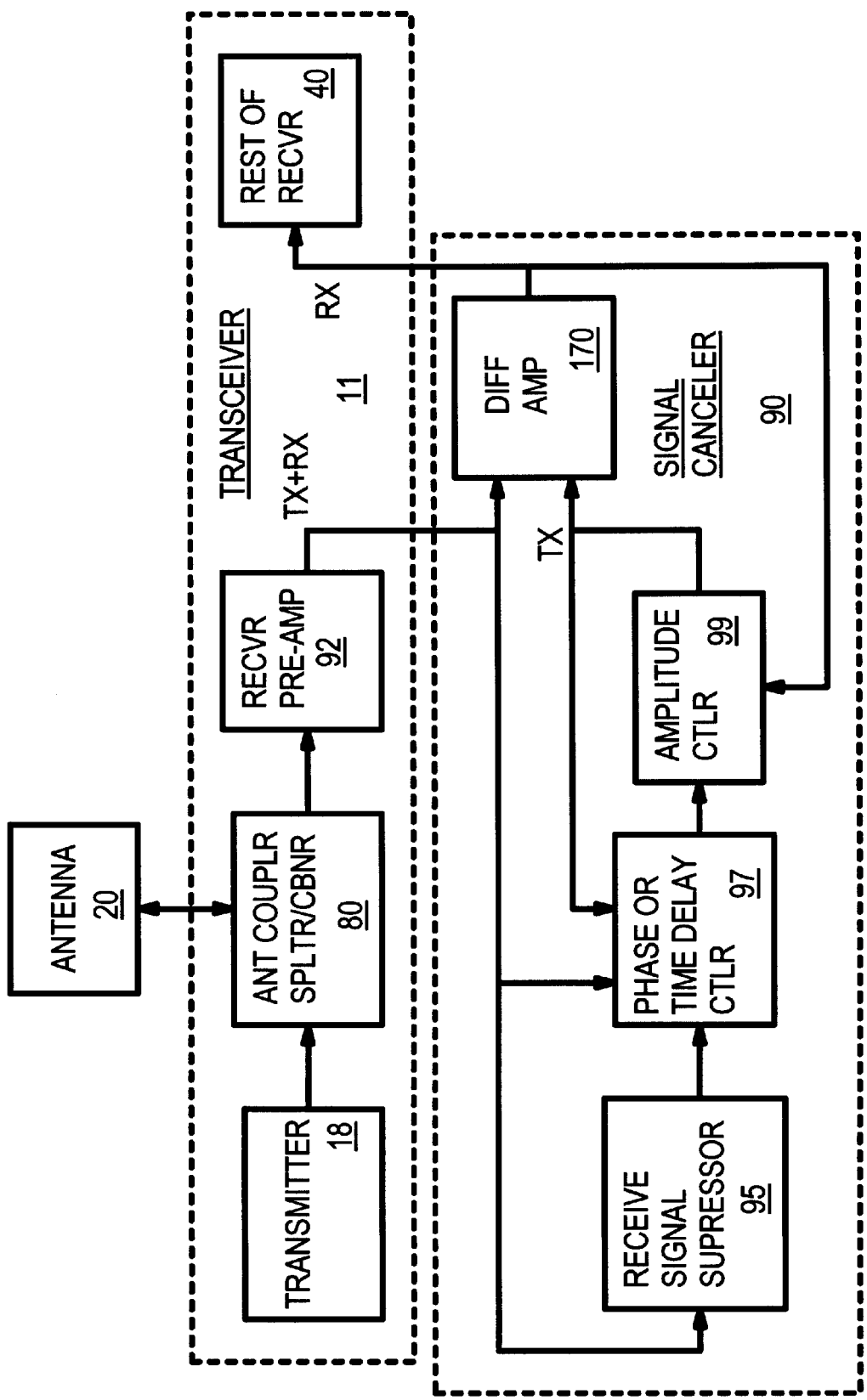
FIG. 7 illustrates basic signal cancellation of the transmit signal, with the transmit signal extracted from within the receiver.

FIG. 7 illustrates basic signal cancellation of the transmit signal. Contained within transceiver 11 is transmitter 18, antenna coupler or splitter/combiner 80, receiver RF preamplifier 92, and remainder of receiver 40. Contained within signal canceler 90 is combiner or difference amplifier 170, receive signal suppressor 95, phase or time delay controller 97 and amplitude controller 99.

Receive signal suppressor 95 further attenuates the receive signal (Rx component of the composite signal TX+RX), which is already much weaker than the transmit signal TX. Receive signal suppressor 95 can be any circuit or device that further reduces the RX level relative to the TX signal, such as a frequency band selective filter. It can also make it easier to adjust phase controller 97 and/or amplitude controller 99 such that the canceling signal entering the TX input of the difference amplifier will consist of a signal that is equal in amplitude and phase to the TX signal component of the composite signal TX+RX.

Phase controller 97 measures the phase of the difference amplifier TX input signal relative to the phase of the difference amplifier TX+RX input signal or (not directly shown) relative to the phase of the signal from receive signal suppressor 95. Phase controller 97 then automatically adjusts its internal time delay such that the canceling signal entering the TX input of the difference amplifier will consist of a signal that is equal in phase to the TX signal component of the composite signal TX+RX.

Amplitude controller 99 measures the amplitude of the signal leaving difference amplifier 170 and adjusts its own internal gain to minimize that amplitude.

Figure 9:
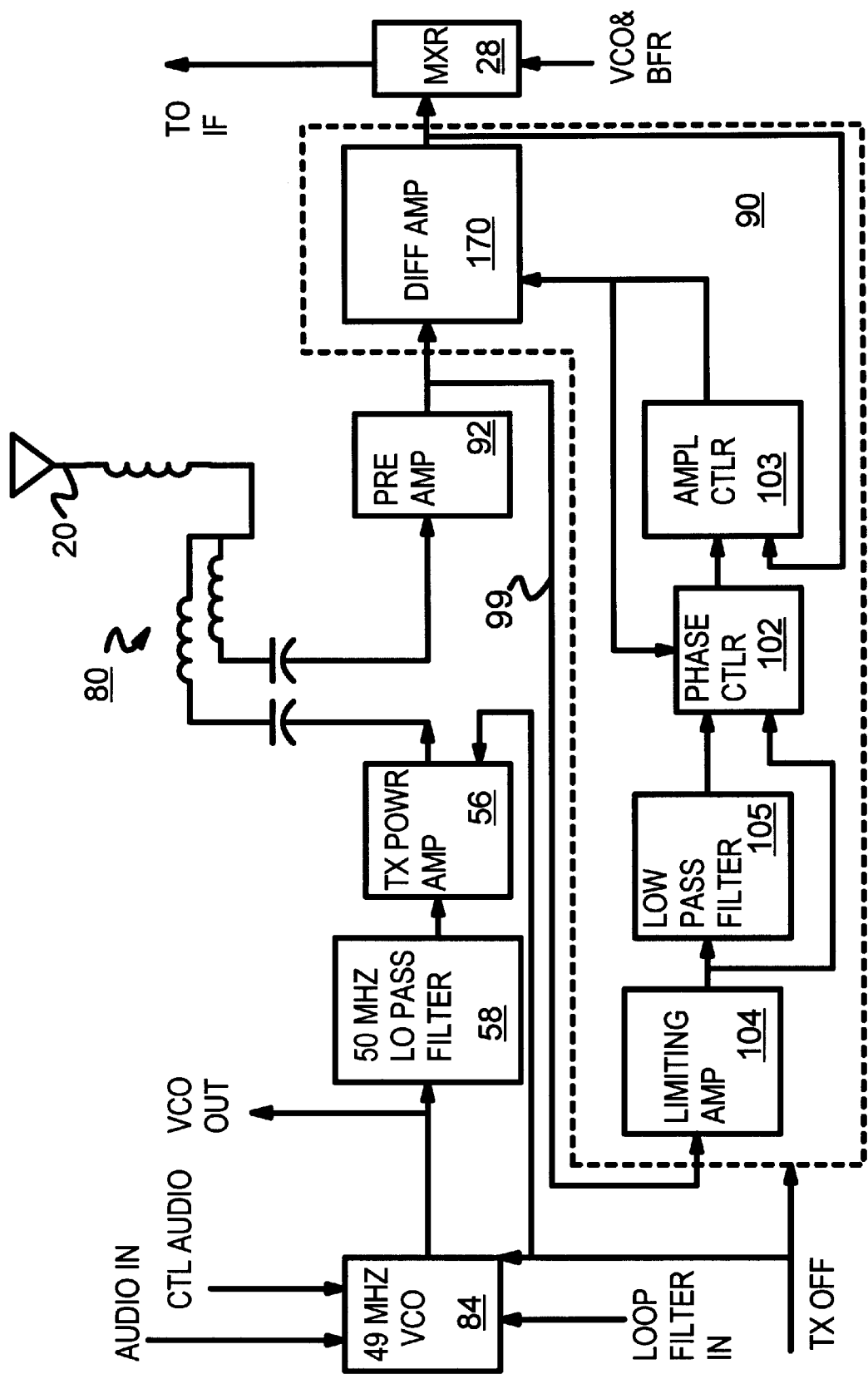
FIG. 9 shows a somewhat more detailed example of signal cancellation of the transmit signal extracted from within the receiver.

FIG. 9 also shows signal cancellation of the transmit signal extracted from within the receiver. Although the canceling signal source 99 could have been taken from the transmitter, such as from low-pass filter 58, or transmit power amp 56, instead the canceling signal source 99 is taken from the receiver side of antenna 20, from low-noise pre-amp 92. Both the receive (RX) and the transmit (TX) signal are output from pre-amp 92 and thus source 99 includes both the transmit and the receive signal.

Voltage Limiter Extracts Transmit Signal from Combined RX & TX Signal

The receive signal can be adequately removed from the combined signal by a very simple selectivity filter. The inventor has realized that the receive signal can also be removed to some extent and with some compromise, from the combined signal using a voltage limiter to clip the amplitude peaks of the combined signal. Since the combined signal is at least 99% transmitter signal (and usually much more), the receive signal superimposed over the larger transmit signal slightly increases the amplitude and has little effect on the phase of the combined signal.

Figure 8:
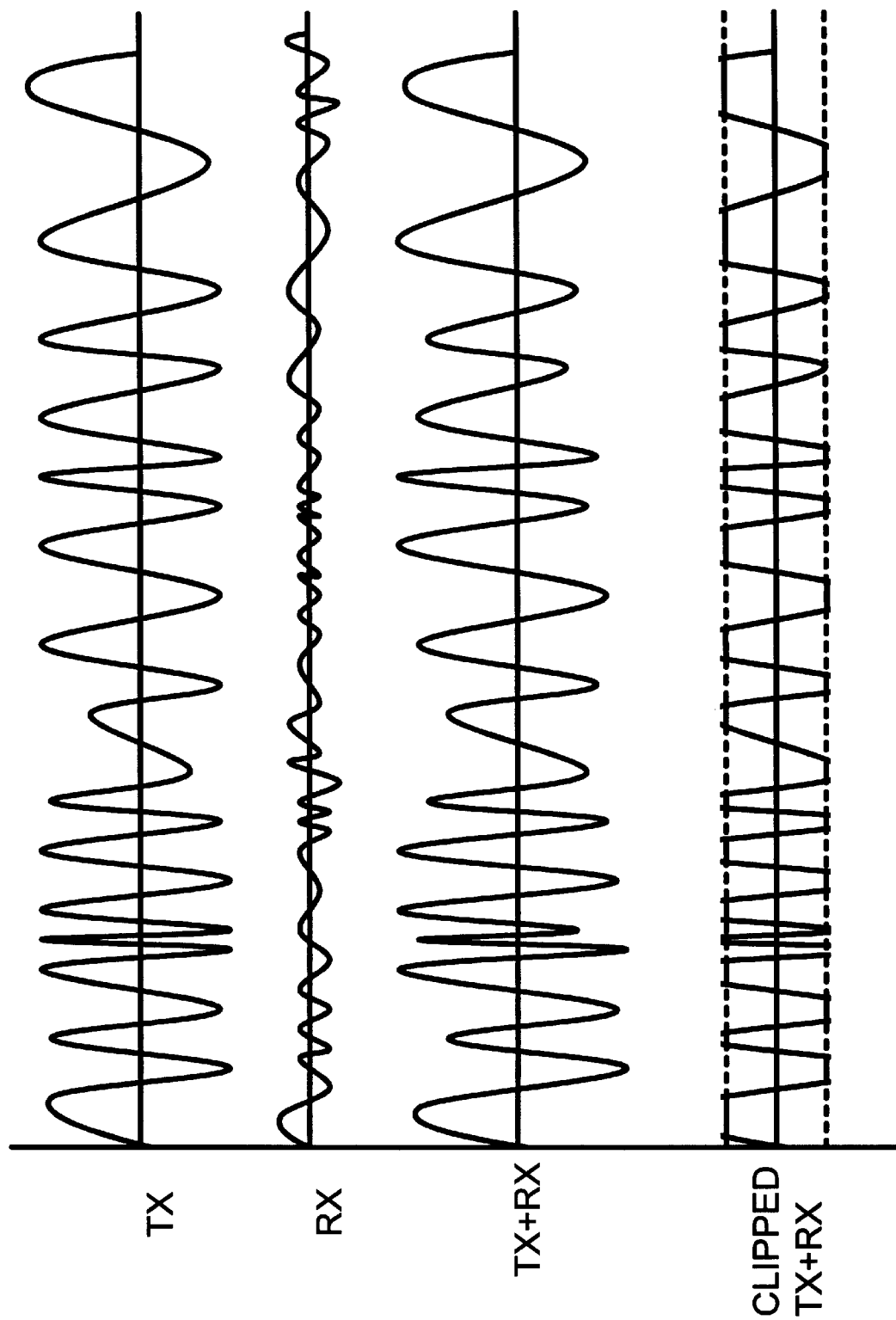
FIG. 8 shows a composite signal from a cordless phone antenna.

FIG. 8 shows a simplified composite signal from a cordless phone antenna. The transmit signal TX is much stronger than the receive signal RX; as this latter signal experiences up to 84 dB of RF wave "path loss" plus a total of 30 dB of antenna coupling losses relative to the local transmitter generating the transmit signal TX. The local transmitter signal TX combines with the receive signal RX in the coupler 80 to form a composite signal TX+RX. The smaller receive signal RX is superposed with the larger transmit signal TX to produce the composite signal. When the peaks of the receive signal RX and transmit signal TX coincide, the amplitude of the TX peak is slightly increased by the RX amplitude. When a TX peak coincides with a RX trough, the TX peak is reduced slightly by the RX peak's amplitude.

Since the TX peaks are much larger than the RX peaks, the effect of RX in the composite signal is small. Even when two stations are within a few feet apart, the receive signal voltage RX is only 1% of the transmit signal TX. Thus the TX peaks are increased or decreased by 1% or less when the receive signal is superimposed to form the composite signal.

The zero-crossing times of the transmit signal are affected even less than the peaks. This is because the slope of the transmit waveform is highest as the zero-amplitude axis is crossed. Increasing or decreasing the amplitude by the receive amplitude does not shift the zero-crossing point by much. Thus the phase and frequency of the composite signal TX+RX is almost identical to the phase and frequency of the transmit signal TX.

Clipping the peaks of the composite signal produces the clipped TX+RX signal shown. Because the zero-crossing times are not significantly affected by superimposing the receive waveform, the phase of the clipped composite signal is almost the same as the phase of the transmit waveform. The inventor uses this similarity of the clipped waveform to partially suppress the receive signal from the composite signal. Had this not been done, combiner 100 output would have ended up being (TX+RX)−(TX+RX)=0. Suppressing the receive signal before applying the amplitude and phase correction allows essentially (TX+RX)−TX=RX. The signal canceling measurement and control system acts to impose a delay which causes cancellation at the transmit frequency at all times. Any vestige of the receive signal present at the signal canceler output would cause a small index amplitude modulation on RX OUT at a modulating frequency equal to the difference in frequency between TX and RX, which is several MHz. This AM would be suppressed by the first IF filter, which is only several hundred KHz wide.

In FIG. 9, the antenna 20 coupler consists of two series tuned circuits. The one connected to the transmitter output is tuned to the center of the transmit band; the one connected to the receiver input is tuned to the center of the receive band. This embodiment permits some reduction (about 10 dB) of the transmit signal before entering the receiver as well as minimal loading of the transmit signal by the receiver. Minimization of loading permits less transmitter output power for a given power delivered to the loading coil (in series with antenna 20). Likewise, there is minimal loading of the receive signal by the transmitter output, thus increasing the receiving efficiency.

In signal canceler 90, the phase difference of the signals entering the two difference amplifier 170 inputs are measured by a phase detector located in phase controller 102. The accurate operation of this phase detector is facilitated by fast rise time signals, obtained by a limiting amplifier within phase controller 102, and limiting amplifier 104 which is also used to help remove the receive signal in favor of the transmit signal entering the signal canceler. The transmit signal component of TX+RX entering difference amplifier 170 is basically a sine wave; so the matching TX signal entering its other input must also be a sine wave. Therefore, low pass filter 105 is used to remove substantially all harmonic content of the clipped signal ("canceler signal") leaving limiting amplifier 104 and entering phase controller 102. Inside phase controller 102, the phase detector drives a servo integrator, which in turn drives a voltage controlled phase shifter. The canceler signal goes through the phase shifter to obtain the correct phase shift such that after passing through the amplitude controller 103 (which takes additional time) its phase will equal that of the transmit signal component of the TX+RX entering difference amplifier 170.

Inside amplitude controller 103 is a synchronous RF level detector, driving a servo integrator, in turn driving a voltage controlled amplifier. The canceler signal passes through this voltage controlled amplifier, whose gain is adjusted such that the fully processed canceler signal entering difference amplifier 170 will have the same level as the transmit component of the TX+RX entering the other 170 input. The synchronous RF level detector is fed by (not shown) the limiting amplifier inside phase controller 102; so this detector is sensitive only to the TX signal. It is also fed by the output of difference amplifier 170. If the TX signal here is zero, the detector output will be zero, causing the servo integrator output to freeze. If the TX signal here is not zero, the detector output will be positive or negative, depending upon the relative signal levels at difference amplifier 170 inputs. This positive or negative voltage will cause the servo integrator to slew in the proper direction to adjust the voltage controlled amplifier gain to move the TX signal level at difference amplifier 170 output closer to zero.

Thus signal canceler 90 uses a signal-cancellation source 99 taken from within the receiver, after antenna 20, and includes any transient phase or amplitude changes to the transmitter signal introduced by antenna 20 (resulting from its varying proximity to external objects) and coupling circuits. Thus difference amplifier 170 compares signals which have both been subjected to the same rapid phase and amplitude transients induced into the antenna circuits.

Sleep Mode

Power can be reduced in the front end by using a sleep mode. A transmitter-off signal powers down VCO 84, and power amp 56. While the transmitter is not running, the signal canceler 90 is not needed; so it can be powered down as well (not shown).

Figure 10:
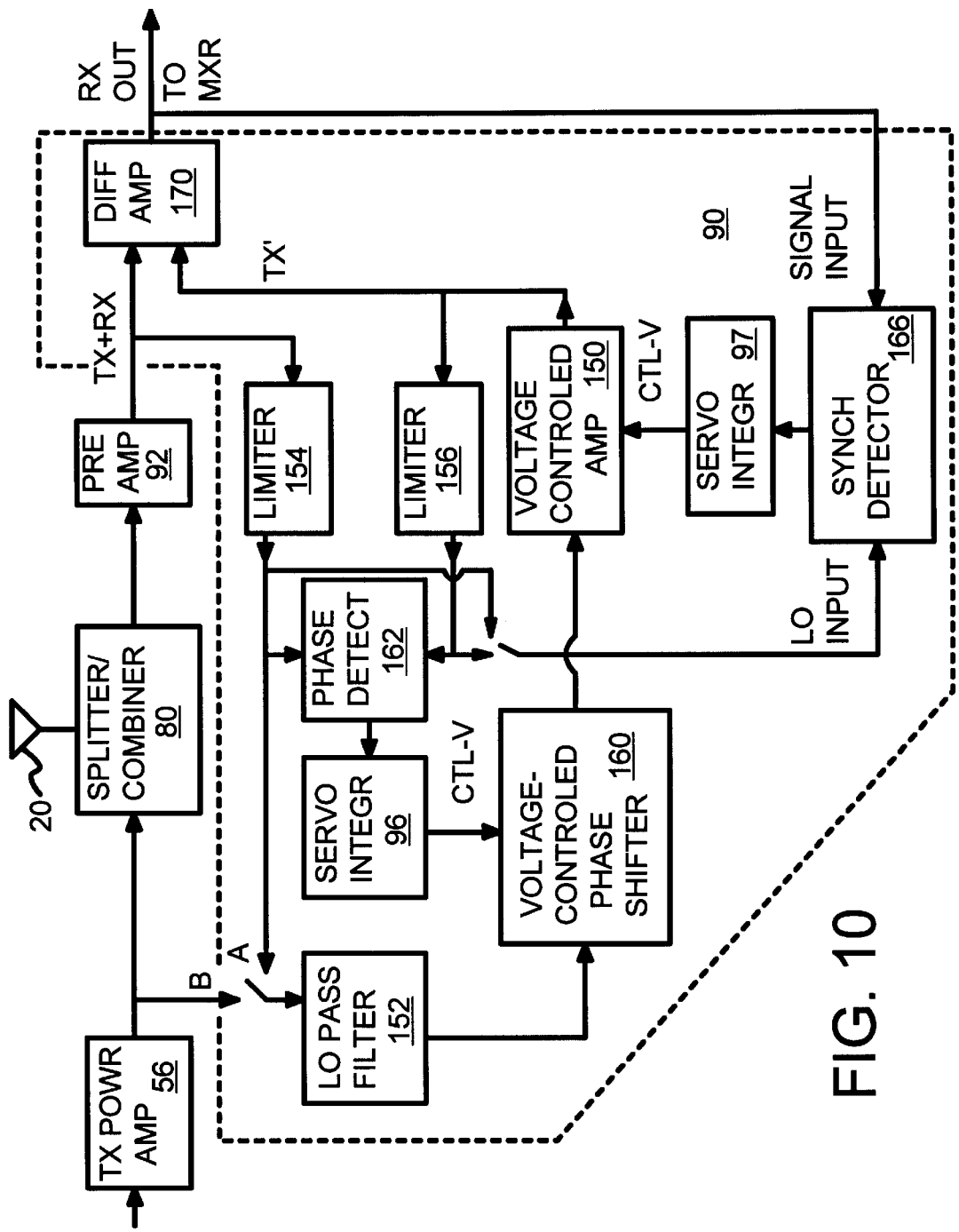
FIG. 10 shows in detail an example of a signal canceler for a cordless phone that extracts the canceling transmit signal from within either the receiver or transmitter.

Detail of Signal Canceler—FIG. 10

FIG. 10 shows in detail one possible embodiment of a signal canceler for a cordless phone that extracts the canceling transmit signal from within the receiver. The transmit signal from power amp 56 is applied to antenna 20 through the antenna coupler splitter/combiner 80 and a series coil (not shown). Antenna 20 receives a signal from a remote phone, but the splitter/combiner also couples a remnant of the transmit signal to low-noise pre-amp 92, a pre-amplifier in the receiver. Both the desired receive signal and the much stronger, undesired transmit signal remnant are amplified by pre-amp 92 and applied to the first input of difference amp 170 as signal TX+RX. The second input of difference amp 170 is driven with a canceling signal TX' that is intended to be equal in amplitude and phase to the transmitter component of the combined signal from pre-amp 92. When equal, the transmit signal is subtracted from the combined signal, leaving just the receive signal RX being output from difference amp 170.

It should be understood that although cancellation of the transmit signal by the signal canceler system is substantial (reducing its voltage level by about 99%), under normal operating conditions, the transmit signal level at the output of differential amplifier 170 is still very much greater than the receive signal level (up to about 60 dB stronger). The key consideration is that this remaining transmit signal vestige be low enough in level that it does not overload successive receiver stages and prevent same from processing the weakest useful receive signal. Finally, the various high selectivity elements within the main body of the receiver following differential amplifier 170 will eliminate the transmit signal.

The objective of this subsystem is to null out whatever transmit signal which gets through splitter/combiner 80 before it reaches the receiver mixer fed by difference amplifier 170 (without also canceling out the desired receiver signal coming from antenna 20). Almost everything in the circuit acts to create a fully processed canceler signal at the second (TX') input of difference amplifier 170 which is identical in amplitude and phase to the transmit signal which exists at the first (TX+RX) input of difference amplifier 170. It is assumed that, for the TX+RX signal, TX is always at least 40 dB (factor of 100 in voltage) larger than RX.

There are two methods shown in FIG. 10 for obtaining the basic TX signal by itself. One of these is to extract it from the transmitter itself (B). The other is to extract it from the receiver (A). Here, limiter 154 suppresses the receive signal—already at least 40 dB below the transmitter signal—even further, leaving only the transmitter signal plus the odd harmonics created in this limiter. These harmonics are suppressed in low pass filter 152. Before entering difference amplifier 170, the canceler signal passes through a phase adjusting block (including voltage controlled phase shifter 160) and an amplitude adjusting block (including voltage controlled amplifier 150).

The amount the canceler signal's phase shift is changed by voltage controlled phase shifter 160 depends upon the voltage on its control input CTL-V. The output of servo integrator 96 can reach any voltage needed by voltage controlled phase shifter 160. As it is an integrator, the input voltage level is always (a constant times) the time rate of change of the output voltage level. Therefore, the output voltage slew rate is proportional to the instantaneous input voltage level. If the error is large, the integrator input level is large, causing the output to slew rapidly (in the direction to decrease the error). If the error is small, the input voltage is small; so the output will slew slowly (helpful to prevent overshoot). The instantaneous speed of correction is proportional to the instantaneous difference between the present value and desired value. The direction and rate of integrator output slew is controlled by the sign and magnitude of the integrator input error voltage. If the error is zero (in this case zero TX volts at phase detector 162 output), the slew rate will also be zero (output freezes).

Phase detector 162 compares the relative phases of the signals entering the two difference amplifier 170 inputs. If they are the same, its output is zero volts, which causes servo integrator 96 output voltage to freeze. If the phases are different, depending upon the amount and sign of the difference, a corresponding proportional (average) voltage will appear at phase detector 96 output, which will cause servo integrator 96 to slew at a proportional speed and in the correct direction to reduce the phase difference. Thus, if phase detector 162 is accurate and the delays through the two limiting amplifiers 154, 156 are the same, the phases of TX and TX' at the two difference amplifier 170 inputs are the same.

Similarly, voltage controlled amplifier 150 can develop a wide variety of amplification factors, depending upon the voltage at its control input CTL-V, and the output of servo integrator 97 can reach any voltage needed by this amplifier. Acting upon the variable TX amplitude and phase (polarity) information it receives from difference amplifier 170 output and the fixed TX phase information it receives from difference amplifier 170 TX input, synchronous detector 166 provides servo integrator 97 with the information it needs to adjust voltage controlled amplifier 150 such that the TX signal coming from difference amplifier 170 output is as close to zero as possible.

Like any other amplitude/envelope detector/demodulator, synchronous detector 166 provides a "DC" output signal which varies its level (goal usually to be proportional) as the time-averaged level (often RMS level) of the RF input signal varies. The whole purpose of this servo loop is to adjust the level of TX at difference amplifier 170 input until its output has a zero TX level. Notice that regardless of whether the TX' level at difference amplifier 170 second input is too high or too low by any specific absolute value amount, the amplitude at its output is the same (even though the phase differs by 180 degrees).

Therefore, an ordinary AM detector (envelope detector) such as a simple diode—or a more sophisticated one used with a high gain amplifier—which provides only amplitude information, can only tell the servo system that the difference amplifier's 170 TX level is not zero as desired and differs from zero by certain amount. It cannot tell the servo system the direction of the error, which would enable servo integrator 97 to slew its output in the correct direction to achieve zero TX volts at difference amplifier's 170 output.

The synchronous type detector 166 is used for three reasons. (1) In addition to receiving the small signal from difference amplifier 170 whose level is being measured, it receives a similar signal (in fact one which is virtually all transmit signal) as a phase reference signal (an amplitude-limited version which therefore has no amplitude information but only phase information) which keeps the same phase, regardless of whether TX' is larger or smaller than the transmit component at the first (TX+RX) input. Therefore, being essentially an algebraic multiplier, synchronous detector's 166 output changes its polarity depending upon the phase of its small signal input, thus, providing the integrator with the information it needs to slew in whichever direction that reduces the error. (2) It is capable of detecting (furnishing a DC level corresponding to average RF level) RF signals down to very low levels, whereas other types of detectors drop out (deliver no output) when the RF level is lower than a certain amount. (3) As it is locked to the phase of the TX signal, it is insensitive to the RX signal which is also present at difference amplifier 170 output, and which can reach levels equal to the residual TX signal. The RX signal always averages zero at the synchronous detector 166 output; as it is incoherent with the reference phase at the L.O. input (coming from limiter 156).

In order for synchronous detector 166 to deliver the largest and most symmetrical possible levels to servo integrator 97, the reference signal coming from limiter 166 at the L.O. input should be in phase (or 180 degrees out of phase) with the small signal coming from difference amplifier 170 output.

A synchronous amplitude detector 166 is nothing more than a heterodyne mixer with the same basic signal fed to each input. The L.O. (Local Oscillator) input from limiter 156 receives the high level limited version, and the signal or RF input from differential amplifier 170 receives the small signal still containing the amplitude information. As the frequencies are identical, the sum and difference output frequencies are twice the original frequency, and zero frequency (DC). Mathematically it is essentially $[\sin(\omega t)][\sin(\omega t)] = \frac{1}{2} - \frac{1}{2}\cos(2\omega t)$ for the in-phase case and the negative of that for the 180 degree out of phase case.

If the second (TX') input of difference amplifier 170 has the same level as the transmit component of its first (TX+RX) input, the TX component of the signal input (coming from difference amplifier 170) of synchronous detector 166 has a zero level signal, and its output will be zero volts, causing servo integrator's 97 output voltage to freeze. If its second input is too high or too low, difference amplifier's 170 output will be non-zero in proportion to the amount—likewise the input of servo integrator 97. Depending upon which of these conditions exists (second input too high or too low), the phase leaving difference amplifier's 170 output and also entering synchronous detector's 166 signal input will differ by 180 degrees, but the signal at the LO input always has a constant phase relative to difference amplifier's 170 TX input. Therefore, depending upon whether the gain must be adjusted up or down, the sign of the voltage at Servo Integrator 97 input will differ. Thus, voltage controlled amplifier 150 will be automatically adjusted for the correct gain to cause the level at difference amplifier's 170 TX' input to equal the transmit signal level at its first input.

Advantages of the Invention

The duplexer is removed from the design of a cordless telephone. The duplexer and its selectivity filters are replaced with a much lower-cost splitter/combiner that provides little or no selectivity. The duplexer is replaced with an electronic signal cancellation circuit that can be integrated. A higher-integration front-end of a cordless phone reduces cost and size. Signal cancellation of the transmit signal can be used without any restriction on the intermediate frequencies or other architectural features of the receiver.

The impedance of the antenna connection can vary widely, especially when objects (such as a person's hand) move around in close proximity to antenna 20. The signal canceler uses a signal-cancellation source taken from within the receiver, after the antenna. The source thus includes any phase and amplitude shifts to the transmitter signal introduced by the antenna and its coupling circuits. Thus, both the reference signal and resultant output signals used by the measurement and control system are located after the phase and amplitude perturbing system block, rather than this system block being in between the two. The signal canceler compares with the desired output signal, not the phase- and amplitude-stable transmit signal taken directly from the transmitter, but the actual, antenna circuit-perturbed transmit component of the combined receive and transmit signal in the receiver. Both signals contain the perturbations; so the signal canceling measurement and control system is protected.

Alternate Embodiments

Several other embodiments are contemplated by the inventor. For example the canceling signal may be inverted in phase before a combiner (adder) or not inverted before the difference amplifier. Several variations of the splitter/combiner and connections to the front-end circuits are contemplated. For instance, FIG. 9 uses a pair of series tuned circuits instead of a hybrid splitter/combiner. The base unit of the cordless phone can be constructed in a different manner than the handheld unit since power is not limited by the battery and a larger antenna is often used and less likely to be touched by human hands in normal operation. The extra available power could be used for receiver front end components which can handle larger transmit signals without overload, thus mitigating the performance needed by the signal cancellation block. The amplifiers and filters may be rearranged in many different configurations. Components and blocks can be inserted at various points in the circuits. For example, capacitors to pass high-frequency small signals and block D.C. biases are commonly used to couple signals. Blocks can be combined or separated.

The voltage limiter that extracts the transmit signal TX from the composite signal TX+RX in FIGS. 8 and 9 can be replaced by a Phase-locked loop (PLL) that operates at the transmit frequency. For this embodiment, a VCO operating at the TX frequency drives a phase comparator (probably through a frequency divider). The other phase comparator input is driven by the TX+RX signal (through an identical frequency divider). The phase comparator output would contain a DC voltage whose level would cause the VCO to run at the TX frequency. This output would also have an AC component at the TX-RX frequency, which would be eliminated by the loop (low pass) filter between the phase comparator output and VCO input. Thus the VCO would contain no RX component at all.

The voltage limiter can also be replaced by a simple notch or bandstop filter, which has the advantage of preserving the amplitude transients present in TX caused by motion of nearby objects relative to the small antenna; thus relieving the gain control system from correcting for them.

In addition, it is conceivable that the method of extracting the transmit signal from the receiver for signal cancellation can be applied to radio (or non-radio) communication systems other than cordless telephones. For instance, it will operate with signals having arbitrary modulation.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. An adaptive signal canceler for a radio-frequency (RF) front-end comprising:

a composite-signal input for a composite signal from an antenna, the composite signal including a receiver signal received by the antenna and a transmitter signal transmitted by the antenna;

an output, the output coupled to a receiver for amplifying the receiver signal, the output for outputting an output receiver signal generated from the composite signal with the transmitter signal substantially cancelled, leaving the receiver signal;

a limiting circuit, coupled to receive the composite signal, for limiting an amplitude of the composite signal to generate a clipped signal having a constant amplitude;

a synchronous detector, coupled to receive the clipped signal from the limiting circuit, and coupled to receive the output receiver signal, for generating an adjust signal;

a canceling-signal generator, coupled to receive the clipped signal and controlled by the adjust signal, for generating a canceling signal from the clipped signal by adjusting a phase and an amplitude of the clipped signal in response to the adjust signal; and a signal combiner, coupled to receive the composite signal and the canceling signal, for combining the canceling signal with the composite signal to generate the output receiver signal, whereby the canceling signal is generated from the composite signal that includes both the transmitter signal and the receiver signal from the antenna.

2. The adaptive signal canceler of claim 1 wherein the synchronous detector includes a minimizer for generating the adjust signal so as to minimize a time-averaged amplitude of the output receiver signal, wherein the adaptive signal canceler operates to minimize the time-averaged amplitude of the output receiver signal;

wherein the receiver signal is asynchronous to the transmitter signal, the receiver signal operating at a different frequency than the transmitter signal, wherein the receiver signal has a time-averaged amplitude of zero when sampled at a rate synchronized to the transmitter signal, whereby the adaptive signal canceler removes the transmitter signal from the composite signal by minimizing the time-averaged amplitude of the output receiver signal.

3. The adaptive signal canceler of claim 2 further comprising:

an integrator, coupled to the adjust signal from the synchronous detector, for time-averaging changes in the adjust signal instantaneously detected by the synchronous detector, whereby the adjust signal is time-averaged.

4. The adaptive signal canceler of claim 3 wherein the integrator is a servo integrator that generates a larger adjust voltage of the adjust signal when a larger phase or amplitude difference between the clipped signal and the output receiver signal is detected, the larger adjust voltage causing the canceling-signal generator to more rapidly change the phase or amplitude of the canceling signal.

5. The adaptive signal canceler of claim 1 wherein the adjust signal comprises:

a phase-adjust signal and an amplitude-adjust signal, the phase-adjust signal indicating an amount of phase adjustment needed for the clipped signal to match a phase of the transmitter signal, the amplitude-adjust signal indicating an amount of amplitude adjustment needed to match an amplitude of the transmitter signal in the composite signal.

6. The adaptive signal canceler of claim 5 wherein the limiting circuit further comprises:

a feedback limiter, receiving the canceling signal from the canceling-signal generator, for generating a second clipped signal, the second clipped signal coupled to the synchronous detector for detecting an amplitude of the output receiver signal;

and wherein the synchronous detector further comprises:

a phase detector, for comparing phases of the clipped signal to the second clipped signal, and for generating a phase-adjust signal to the canceling-signal generator.

7. The adaptive signal canceler of claim 5 further comprising:

a low-pass filter on the clipped signal, for removing higher-frequency harmonics of the receiver signal from the clipped signal.

8. The adaptive signal canceler of claim 1 wherein the adaptive signal canceler is not connected to a transmitter generating the transmitter signal, the adaptive signal canceler generating the canceling signal from the composite signal and not from an isolated transmitter signal without the receiver signal.

9. The adaptive signal canceler of claim 8 wherein impedance changes of the antenna occur when a person touches the antenna, the impedance changes altering the phase and amplitude of the transmitter signal in the composite signal, whereby the canceling signal is adapted to the impedance changes of the antenna by extracting the transmitter signal from the composite signal after the antenna, the canceling signal being adjusted in phase and amplitude independent of the impedance changes that alter the transmitter signal.

10. The adaptive signal canceler of claim 1 wherein the signal combiner comprises a difference amplifier, the canceling signal being an inverse of the transmitter signal extracted from the composite signal.

11. A cordless phone comprising:

a common antenna for both transmitting a transmit signal and for receiving a receive signal;

an antenna coupler connected to the common antenna, the antenna coupler having an input for the transmit signal and an output for a composite signal that includes both the receive signal and the transmit signal;

a transmitter, coupled to accept and frequency-modulate an audio signal to generate at a radio-frequency the transmit signal, the transmitter sending the transmit signal to the common antenna through the input of the antenna coupler, the transmitter operating at a transmit frequency;

a receiver, coupled to accept the composite signal from the common antenna through the output of the antenna coupler, for generating an audio input signal from a radio-frequency of the receive signal, the receiver operating at a receive frequency different from the transmit frequency; and a signal canceler, within the receiver, for extracting a modified transmit signal from the composite signal, the signal canceler subtracting the modified transmit signal from the composite signal to generate a recovered receive signal, the recovered receive signal being used by the receiver to generate the audio input signal, wherein the modified transmit signal is significantly larger than the receive signal wherein voltage extremes of the composite signal contain the receive signal superimposed on the transmit signal, and wherein the signal canceler further comprises:

a difference amplifier, receiving the composite signal and a canceling signal, for outputting the recovered receive signal as a difference of the composite signal and the canceling signal;

a first voltage limiter, receiving the composite signal, for removing the voltage extremes of the composite signal to generate a clipped signal;

a second voltage limiter, receiving the canceling signal, for outputting a second clipped signal having phase information of the canceling signal;

a phase comparator, coupled to the clipped signal and the second clipped signal, for outputting a phase-difference signal;

a phase shifter, receiving the clipped signal, for advancing or retarding a phase of the clipped signal in response to the phase-difference signal, the phase-shifter outputting a phase-altered signal;

a synchronous detector, coupled to the second clipped signal and coupled to the recovered receive signal from the difference amplifier, for detecting an average amplitude of the recovered receive signal, the average amplitude being an average over a transmit-signal period of the second clipped signal; and a gain-controlled amplifier, coupled to the synchronous detector and to the phase-altered signal from the phase shifter, for amplifying the phase-altered signal by a gain controlled by the average amplitude detected by the synchronous detector to generate the canceling signal, whereby the composite signal is clipped, phase-adjusted, and gain-adjusted to generate the canceling signal and whereby the recovered receive signal is generated from the composite signal from the common antenna by canceling the modified transmit signal extracted from the composite signal by the signal canceler.

12. The cordless phone of claim 11 wherein the modified transmit signal is not exactly equivalent to the transmit signal from the transmitter, the common antenna and the antenna coupler modifying the transmit signal to generate the modified transmit signal, whereby the signal canceler subtracts the modified transmit signal from the composite signal, the signal canceler adapting to alterations of the transmit signal by the common antenna and the antenna coupler.

13. The cordless phone of claim 12 further comprising:

pre-amplifier means, coupled between the antenna coupler and the signal canceler, for amplifying the composite signal from the antenna coupler.

14. The cordless phone of claim 11 wherein the antenna coupler is a ferrite-core coupler attenuating the transmit signal and the receive signal by about a same attenuation, whereby the antenna coupler provides an insignificant selectivity between the transmit and receive signals.

15. The cordless phone of claim 14 wherein a duplexer is eliminated from the antenna coupler.

16. The cordless phone of claim 14 wherein the common antenna is less than one-quarter of a wavelength of the transmit frequency, the common antenna being sensitive to handling by a person and altering phase or amplitude of the transmit signal coupled to the receiver.

17. The cordless phone of claim 11 wherein the transmit frequency and the receive frequency are near 49 MHz.

18. A signal canceler for a cordless telephone receiver comprising:

combiner means, receiving a composite signal that includes a transmit signal and a receive signal, the combiner means also receiving a canceling signal, for outputting a recovered receive signal as a difference or sum of the composite signal and the canceling signal;

first voltage limiter means, receiving the composite signal, for removing voltage extremes of the composite signal to generate a clipped signal;

phase comparator means, coupled to the clipped signal, for outputting a phase-difference signal indicating a phase difference between the clipped signal and the canceling signal;

phase shift means, receiving the clipped signal, for adjusting a phase of the clipped signal in response to the phase-difference signal, the phase-shifter outputting a phase-altered signal;

synchronous detect means, coupled to the recovered receive signal, for detecting an average of the recovered receive signal, the average being an average over a transmit-signal period; and gain-control means, coupled to the synchronous detect means and to the phase-altered signal from the phase shifter, for amplifying or attenuating the phase-altered signal by a gain that is controlled by the average detected by the synchronous detect means to generate the canceling signal, whereby the composite signal is clipped, phase-adjusted, and gain-adjusted to generate the canceling signal.

* * * * *